Figure 1:
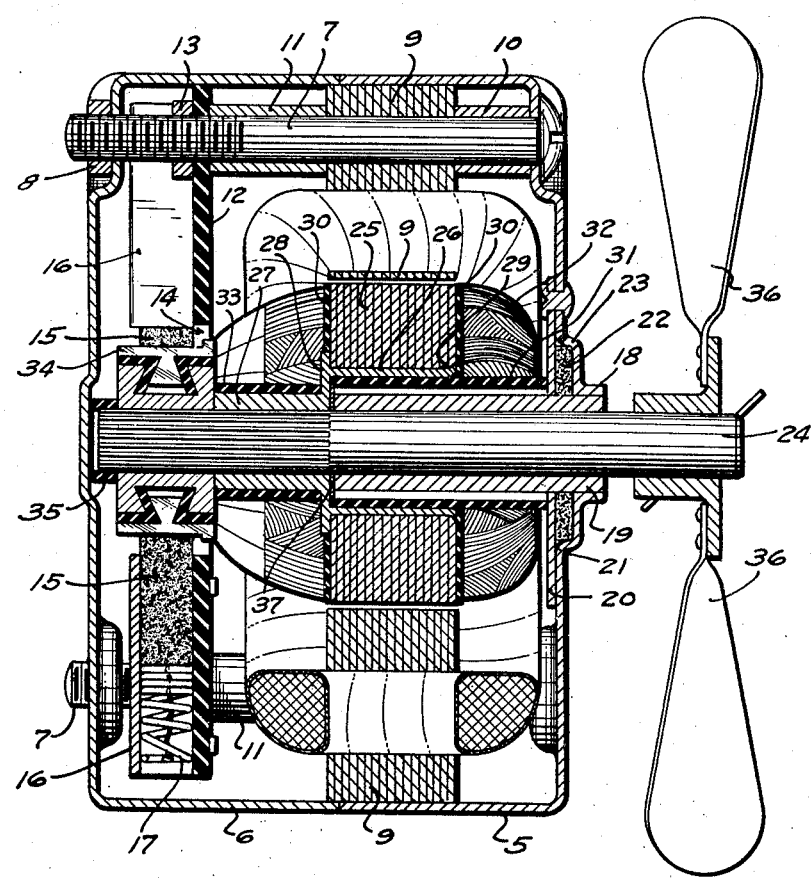

Oct. 17, 1939.   S. S. BRINDA   2,176,118
ELECTRIC MOTOR
Filed May 20, 1938    2 Sheets-Sheet 1

Inventor
Steven S. Brinda
By his Attorneys

Oct. 17, 1939.  S. S. BRINDA  2,176,118
ELECTRIC MOTOR
Filed May 20, 1938   2 Sheets-Sheet 2
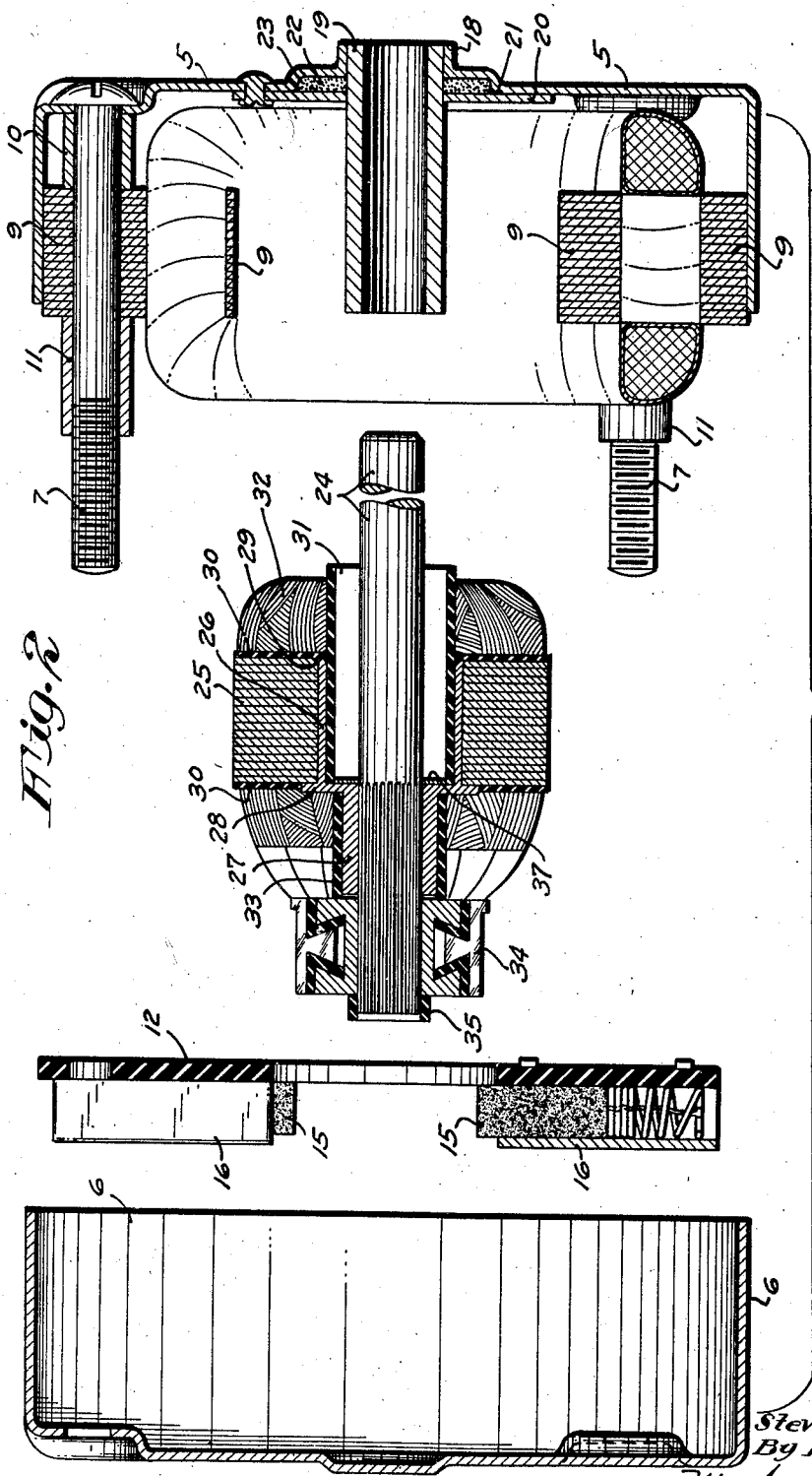
Inventor
Steven S. Brinda
By his Attorneys Patented Oct. 17, 1939

2,176,118

UNITED STATES PATENT OFFICE 2,176,118

ELECTRIC MOTOR

Steven S. Brinda, Minneapolis, Minn.

Application May 20, 1938, Serial No. 209,032

3 Claims. (Cl. 172—36)

My invention relates to electric machines generally designated as electric motors and generators. It is a well known fact that there is no essential difference in the construction of an electric motor and an electric generator. My invention, however, primarily has for its object to improve the construction of electric motors and hence, usually in the following description and in the claims the term electric motor will for convenience be employed with the understanding that the same general principles of construction may be involved in electric generators, and that the invention is herein claimed from the above noted broad point of view.

My improved motor may be made in various sizes and used for various different purposes, but one of the immediate objects I had in mind is the provision of a small low cost electric motor of light weight and very compact construction suitable for driving fans and the like.

As a feature of the invention, the motor casing or enclosing housing is made only large enough to enclose the field and armature of the motor with the bearing for the armature extended within the casing and into the interior of the armature. With the arrangement it is not necessary to project the armature bearing outside of the casing or to make the casing larger than above stated, and at the same time a long bearing for the armature shaft is provided.

As a further and novel feature the casing is made in sections with the field laminations and winding mounted within the major portion of the casing, and with the armature bushings mounted on the minor or relatively movable or removable part of the casing. This arrangement, as will more fully appear, affords a very simple and convenient arrangement for both the construction and assembling of the parts of the motor.

Generally stated the invention consists of novel devices, combination of devices and arrangements of parts hereinafter described and defined in the claims.

Referring to the drawings wherein like characters indicate like parts throughout the several views:

Fig. 1 is an axial section taken through the complete motor with the parts thereof assembled; and Fig. 2 is an axial section showing the four main parts of the motor in section but drawn axially apart.

The motor casing is preferably of pressed metal structure made up of a main or relatively fixed section 5 and a removable section 6, which parts are rigidly but detachably connected by long screw bolts 7 passed through the sides of the casing sections and provided with clamping nuts 8. The field laminations 9 are of the usual annular form and fitted within the main casing 5 and held in position by the bolts 7 which are passed through perforations in the laminations. Spacing sleeves 10 and 11 on the bolts 7 hold the laminations 9 against lateral displacement. The bolts 7 are also passed through the annular plate 12 fiber or other insulating material which is held against the sleeves 11 by nuts 13 on the threaded ends of the bolts 7. This plate 12 serves to support the commutator brushes and is provided with a large axial passage 14 that clears the commutator, presently to be noted. The commutator brushes 15, as illustrated, are of the usual form shown as mounted to slide in metallic brush holders 16 and subject to light coil spring 17. These metallic holders 16 are bolted or otherwise rigidly secured to the insulating disc 12.

The major case section 5 at its axis is shown as provided with a laterally pressed hub 18 in which is rigidly secured a long bearing sleeve 19 that projects axially in to and nearly or quite completely through the said section 5. This bearing sleeve 19 affords the relatively fixed bearing for the armature shaft bushings to be noted. Riveted or otherwise secured to the side plate of the case section 5 and extended into contact with the exterior of the sleeve 19 is an annular plate 20, preferably of sheet metal. Here it will be noted that outward of the hub 18 the side plate of the case section 5 is bulged laterally to afford an annular pocket 21 for the reception of oil absorbing material 22. Also at its top the pocket 21 is provided with an oil port 23 for the introduction of oil to the absorbent material 22. Here it should be stated that the bearing sleeve 19 is preferably of porous material or is of such character or arrangement that oil from the pocket or from the absorbent material in the pocket will be conducted to the interior of the bearing sleeve, and hence, on to the armature shaft.

The armature and the commutator are mounted on the armature shaft 24 that fits the bearing sleeve 19 and projects therethrough at one end so that power may be taken off of the same in case the device be used as a motor, or so that power may be applied to the said shaft and armature if the device be used as a dynamo. The armature laminations 25 are clamped on the enlarged sleeve-like portion 26 of an armature hub 27 that is keyed or otherwise rigidly secured on the armature shaft 24. It will be noted that the hub 27 is relatively short as compared with the width of the complete armature; that said hub is provided with a retaining flange 28 and that the projecting end of the enlarged sleeve portion 26 is upset at 29 so that the laminations 25 will be securely held on the said sleeve between said elements 28 and 29. The numeral 30 indicates insulating washers placed against the outside laminations 25.

The numeral 31 indicates a bushing preferably of insulating fiber that is telescoped into the sleeve 26 and projects therefrom to afford a support for the armature winding 32. This armature winding 32 is wound on the projecting end of the bushing 31 and on an insulating bushing 33 that is telescoped on to the hub 27. Here it will be noted that when the parts are assembled as shown in Fig. 1, the insulating bushing 31 will be concentric to but spaced outward from the bearing sleeve 19.

The commutator 34, which is of the usual structure, arranged for co-operation with the brushes 15 is secured to the shaft and located immediately adjacent to the armature winding and is secured on the projecting end of the armature shaft. To take the end thrust on the armature shaft 24 in a direction from right to the left in respect to Fig. 1 that end of the armature shaft is shown as provided with a cap or end washer 35, preferably of wood fiber or similar insulating material.

As an illustration of a device that is to receive power from and be driven by the armature, a fan 36 is in Fig. 1 shown as applied to the projecting end of the armature shaft 24.

As already indicated the device is capable of various uses. In the use for driving a fan the device will be found highly efficient as a motor driven device in connection with auto heaters and the like.

In the foregoing it is evident in a motor of the very maximum lateral and other dimensions, a relatively long bearing for the motor shaft is provided. This is accomplished by extending the bearing sleeve into the armature and using relatively short or narrow contacting surfaces, the one for securing the sleeve rigidly to the motor casing and the other for rigidly securing the armature to the armature shaft. Obviously running bearings should be long or wide while rigidly secured parts may be relatively narrow.

The numeral 37 indicates a steel washer placed on shaft 24 between the hub 27 and the inner end of sleeve 19. Preferably that portion of shaft 24 on which the hub 27 and the commutator 34 are mounted is longitudinally grooved.

As above stated, the casing of the machine is preferably of pressed steel or sheet metal, but it may be of cast metal or any other suitable material.

The described construction of the machine and the novel manner of mounting the same effectively keeps the oil from entering or reaching the commutator.

What I claim is:

1. In an electric machine of the kind described, a casing comprising relatively fixed main and removable supplemental sections, a bearing sleeve secured at one end to said main case section and projecting into the casing, an armature shaft journaled in and projecting beyond said bearing sleeve, an armature having, at one side, a hub secured on said shaft and having an axial cavity extended from said hub and surrounding said bearing sleeve, a commutator secured on said shaft adjacent said hub, an insulating disc-like brush support within said casing, spaced from but adjacent to the removable case section, armature brushes supported by said disc-like support, field magnet within said casing surrounding said armature, and bolts passed through the side of said main case section and through the field magnet, said bolts further having threaded portions passed through said disc-like brush support and through the side of the removable case section, and nuts on the threaded ends of said bolts independently holding said disc-like brush support and the removable case section, in rigid assembled association, in respect to said main case section and field magnet.

2. The structure defined in claim 1 in which said armature has a laminated body and the hub of said armature has an outstanding annular flange with a sleeve on which sleeve the laminations of said armature are secured.

3. In an electric machine of the kind described, an armature shaft, and laminated armature body secured thereon, said armature having a hub with an outstanding annular flange with laterally extended relatively large sleeve, on which sleeve the armature laminations are applied, the extended end of said sleeve being upset to clamp the armature laminations between the same and the flange of said hub.

STEVEN S. BRINDA.